United States Patent
Heideman et al.

(10) Patent No.: US 10,330,460 B2
(45) Date of Patent: Jun. 25, 2019

(54) CALIBRATION METHOD AND SYSTEM FOR A FAST STEERING MIRROR

(71) Applicant: RAYTHEON COMPANY, Waltham, MA (US)

(72) Inventors: Kyle Heideman, El Segundo, CA (US); Andrew Bullard, Manhattan Beach, CA (US); Matthew E. Jenkins, El Segundo, CA (US); John J. Anagnost, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 103 days.

(21) Appl. No.: 15/621,230

(22) Filed: Jun. 13, 2017

(65) Prior Publication Data

US 2018/0356204 A1    Dec. 13, 2018

(51) Int. Cl.
| | | |
|---|---|---|
| G01B 9/02 | (2006.01) | |
| G02B 26/08 | (2006.01) | |
| G02B 7/182 | (2006.01) | |
| G01D 5/26 | (2006.01) | |
| G01M 11/00 | (2006.01) | |
| G02B 5/32 | (2006.01) | |
| G03H 1/08 | (2006.01) | |

(52) U.S. Cl.
CPC ..... *G01B 9/02069* (2013.01); *G01B 9/02009* (2013.01); *G01B 9/02047* (2013.01); *G01D 5/266* (2013.01); *G01M 11/005* (2013.01); *G02B 5/32* (2013.01); *G02B 7/1827* (2013.01); *G02B 26/0825* (2013.01); *G03H 1/08* (2013.01); *G02B 26/0816* (2013.01)

(58) Field of Classification Search
CPC ............ G01B 9/02019; G01B 9/02015; G01B 9/02047
See application file for complete search history.

(56) References Cited

U.S. PATENT DOCUMENTS

| 4,717,250 A * | 1/1988 | Sommargren ......... G01B 11/26 356/485 |
|---|---|---|
| 4,746,216 A * | 5/1988 | Sommargren ......... G01B 11/26 356/485 |
| 7,605,926 B1 | 10/2009 | Hetzler et al. |
| 2003/0025982 A1 | 2/2003 | Wang et al. |

(Continued)

FOREIGN PATENT DOCUMENTS

| CN | 101520323 A | 9/2009 |
|---|---|---|
| DE | 102014117511 A1 | 6/2016 |

OTHER PUBLICATIONS

International Search Report and Written Opinion for application No. PCT/US2018/018300 dated May 7, 2018.

*Primary Examiner* — Jonathan M Hansen
(74) *Attorney, Agent, or Firm* — Lando & Anastasi, LLP

(57) ABSTRACT

A calibration system for calibrating a tilt angle of the fast steering mirror includes a position sensing device configured to generate a beam of electromagnetic radiation, and a diffractive optical element, positioned between the position sensing device and the fast steering mirror, the diffractive optical element being configured to divide the input beam into a plurality of output beams directed to the fast steering mirror. The position sensing device is configured to determine a tilt angle of the fast steering mirror. A method to calibrate a tilt angle of the fast steering mirror is further disclosed.

18 Claims, 3 Drawing Sheets

(56) References Cited

U.S. PATENT DOCUMENTS

2005/0168790 A1     8/2005   Latypov et al.
2010/0328643 A1    12/2010   Kotler et al.
2011/0279823 A1*   11/2011   Ueki ................ G01B 11/2441
                                                                          356/511

\* cited by examiner

CALIBRATION METHOD AND SYSTEM FOR A FAST STEERING MIRROR

GOVERNMENT LICENSE RIGHTS

This invention was made with Government support. The Government has certain rights in the invention.

BACKGROUND OF THE INVENTION

Embodiments of the present disclosure relate to a fast steering mirror, and more particularly to methods and systems to calibrate fast steering mirrors. Such fast steering mirrors may be deployed in a sensor or video system associated with a vehicle, a vessel or an aircraft, for example.

Fast steering mirror systems are known, and provide the backbone of some conventional sensors and/or video systems. For some applications, the fast steering mirror needs to be calibrated. Calibration of high order errors requires a large number of measurements, which is a time consuming task when using traditional measurement systems. Traditional measurement systems are prone to systematic errors caused by changes in environmental conditions. Many calibration systems use a theodolite, which is an autocollimator mounted on a gimbal to calibrate angular travel. One limitation associated with the theodolite is that it is only as accurate as an encoder associated with the gimbal. Moreover, theodolite measurements are time consuming to perform, making this approach difficult to use for higher order correction. Laser trackers are also used to calibrate fast steering mirrors since they can be automated, which is good for high order correction. Measurement resolution and measurement range compete against one another, which limit the range and resolution required to calibrate fast steering mirrors.

SUMMARY OF INVENTION

One aspect of the present disclosure is directed to a calibration system for calibrating a tilt angle of the fast steering mirror. In one embodiment, the calibration system comprises a position sensing device configured to generate a beam of electromagnetic radiation, and a diffractive optical element, positioned between the position sensing device and the fast steering mirror, the diffractive optical element being configured to divide the input beam into a plurality of output beams directed to the fast steering mirror. The position sensing device is configured to determine a tilt angle of the fast steering mirror.

Embodiments of the calibrations system further may include embodying the position sensing device with an interferometer attached to a fixed surface. The interferometer may be configured to generate light. Each output beam may retain the same optical characteristics as the input beam, including size, polarization and phase. The diffractive optical element may be configured to generate one of a 1-dimensional beam array and a 2-dimensional beam matrix. The diffractive optical element may be configured to be used with monochromatic light generated by the position sensing device, and may be designed for a specific wavelength and angle of separation between output beams. The diffractive optical element may include a computer generated hologram. The fast steering mirror may include a reflective surface, and may be configured to manipulate the reflective surface to control a direction of the reflection of electromagnetic radiation off of the reflective surface. The fast steering mirror further may include a fixed base, a pivot flexure or bearing, which couples the reflective surface to the base, and several actuators each configured to move the reflective surface relative to the base.

Another aspect of the present disclosure is directed to a method to calibrate a tilt angle of the fast steering mirror. In one embodiment, the method comprises: generating an input beam of electromagnetic radiation from a position sensing device; dividing the input beam into a plurality of output beams directed to the fast steering mirror; and determining a tilt angle of the fast steering mirror based on a reflection of the output beams by the fast steering mirror.

Embodiments of the method further may include generating the input beam by a position sensing device. The plurality of output beams may be created by a diffractive optical element between the position sensing device and the fast steering mirror. The position sensing device may include an interferometer attached to a fixed surface, the interferometer being configured to generate light. Each output beam may retain the same optical characteristics as the input beam, including size, polarization and phase. The diffractive optical element may be configured to generate one of a 1-dimensional beam array and a 2-dimensional beam matrix. The diffractive optical element may be configured to be used with monochromatic light generated by the position sensing device, and may be designed for a specific wavelength and angle of separation between output beams. The diffractive optical element may include a computer generated hologram configured. The fast steering mirror may include a reflective surface, and may be configured to manipulate the reflective surface to control a direction of the reflection of electromagnetic radiation off of the reflective surface. The fast steering mirror further may include a fixed base, a pivot flexure or bearing, which couples the reflective surface to the base, and several actuators each configured to move the reflective surface relative to the base.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Embodiments of the present disclosure are directed to a calibration method and system that uses an interferometer and a diffractive optical element (DOE), including, in some embodiments, a computer generated hologram (CGH), to calibrate a tilt angle of a mirror, including a fast steering mirror (FSM). The use of a CGH enables the process to be automated, is tolerant to different environments, and can be made to high precision.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figures 1A, 1B:
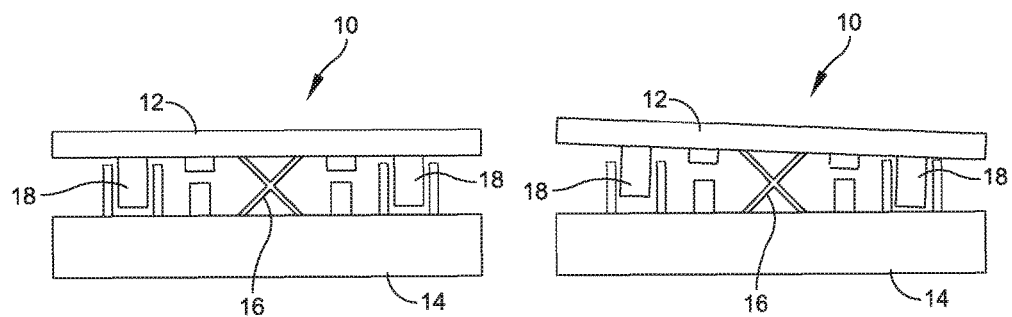
FIGS. 1A and 1B are schematic views of a fast steering mirror.

FIGS. 1A and 1B are diagrams illustrating the functional elements of a fast steering mirror, generally indicated at 10, which is configured to manipulate a reflective surface 12 to control a direction of the reflection of electromagnetic radiation, including light, off of the reflective surface 12. The fast steering mirror 10 further is configured to steer the reflective surface 12 as a unit, and can be deployable within a sensor or video system, and/or may form part of a vehicle, vessel, or aircraft carrying such a sensor or video system (e.g., an unmanned vehicle, vessel, or aircraft).

In the shown embodiment, the fast steering mirror 10 includes a fixed base 14, a pivot flexure or bearing 16, which couples the reflective surface 12 to the base 14, and several actuators, each indicated at 18, which move the reflective surface 12 relative to the base 14. The base 14 is configured to provide a substrate on which at least some of the other components of fast steering mirror 10 can be mounted. In use, the base 14 is mounted within the larger system that the fast steering mirror 10 operates (e.g., within a larger sensor system). The base 14 may be formed from one or more of aluminum alloys, stainless steels, beryllium, or low expansion nickel alloys, and/or other suitable materials. The base 14 may be formed as a single component or as a plurality of separate components coupled together in a fixed configuration.

For the purposes of this disclosure, a component may be considered to be connected to the base 14 if some point or portion of the component is fixed in position with respect to the base 14. This may include a component fixed with respect to the base 14 by being secure in the environment within which the base 14 is installed (e.g., an overall sensor housing or seat), a component affixed at a point or portion to some other component that is immovable (or substantially so) with respect to base 14, and/or other components that have a point or portion fixed in position with respect to the base 14.

FIG. 1A illustrates the FSM 10 in a "normal" position in which the reflective surface 12 is configured to direct light in a normal direction away from the FSM 10. FIG. 1B illustrates the FSM 10 in a "tilted" position in which the reflective surface 12 is configured to direct light at an angle with respect to the normal direction of the FSM 20. The actuators 18 are configured to position the reflective surface 12 at a desired tilt angle.

Figure 2A:
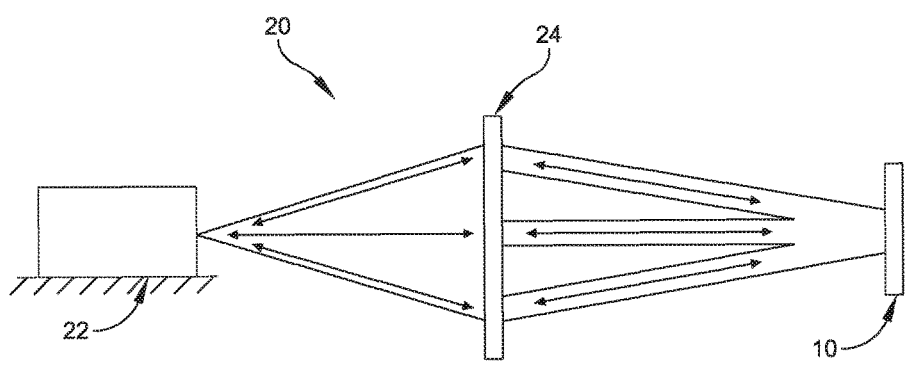
FIGS. 2A and 2B are schematic views of a system to calibrate the fast steering mirror of an embodiment of the present disclosure.
Figure 2B:
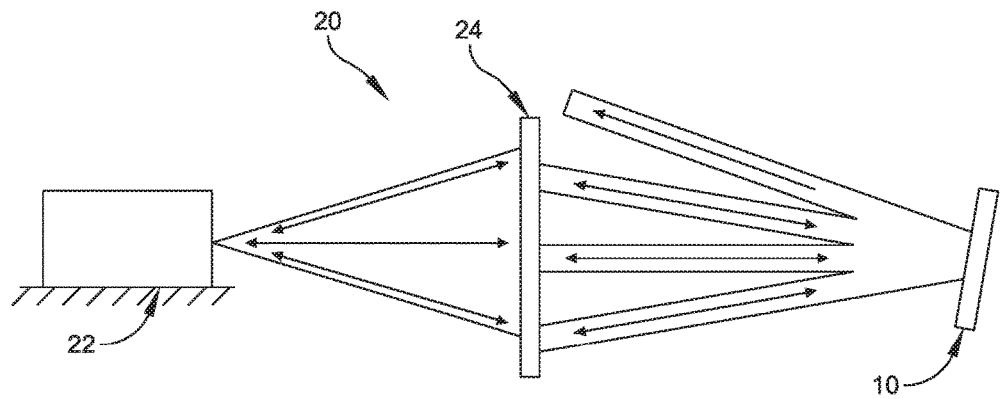

FIGS. 2A and 2B illustrate one embodiment of a calibration system, generally indicated at 20, for calibrating a tilt angle of the FSM 10. The calibration system 20 includes a position sensing device, generally indicated at 22, attached to a fixed surface. In one embodiment, the position sensing device 22 includes an interferometer. Interferometry makes use of the principle of superposition to combine waves in a way that will cause the result of their combination to have some meaningful property that is diagnostic of the original state of the waves. The operation of the interferometer 22 is achieved when two waves with the same frequency combine. The resulting intensity pattern is determined by the phase difference between the two waves, with waves that are in phase undergoing constructive interference while waves that are out of phase undergoing destructive interference. Waves that are not completely in phase and not completely out of phase will have an intermediate intensity pattern, which can be used to determine their relative phase difference. Stated another way, with an interferometer, light from a single source is split into two beams that travel along different optical paths. The two beams are combined again to produce an interference. The resulting interference of the beams provides information about the difference in path length. Interferometers are used to measure lengths and the shape of optical components with nanometer precision. Most interferometers use light or some other form of electromagnetic radiation.

The calibration system 20 further includes a diffractive optical element (DOE), generally indicated at 24, sometimes referred to as a diffractive beam splitter, which is spaced a predetermined distance from the interferometer 22, and positioned between the interferometer 22 and the FSM 10. The spacing between the interferometer 22, the DOE 24 and the FSM 10 depends largely on the output of the DOE. For example, the spacing is largely irrelevant as long as the coherence length of the interferometer 22, plus round trip of the optical path difference post-DOE 24, does not approach or exceed the coherence length of the interferometer laser. This parameter will vary as a function of the laser used in the unit (producer, laser). In general, the further the spacing between these components, the greater risk of increased retrace error. The real discriminator of distance should be between the DOE 24 and the reflective surface 12 of the FSM 10. The angular range and physical dimensions of the reflective surface 12 limits how close the spacing can be. In the situation for some angular ranges of mirror travel (+/−10 degrees), the interferometric input by the interferometer 22 to the DOE 24 is collimated, so the spacing between interferometer 22 and DOE 24 can be more of a convenience issue. If the input is required to be convergent/divergent to the DOE 24, then the spacing will be determined by the DOE aperture. The DOE 24 is configured to divide an input beam into a plurality (N) of output beams. Each output beam retains the same optical characteristics as the input beam, such as size, polarization and phase. A DOE 24 can generate either a 1-dimensional beam array (1×N) or a 2-dimensional beam matrix (M×N), depending on the diffractive pattern of the element. The DOE 24 (diffractive beam splitter) is used with monochromatic light generated by the interferometer 22, and is designed for a specific wavelength and angle of separation between output beams.

In the shown embodiment, the DOE 24 is a computer generated hologram (CGH) configured to generate a holographic image. In some embodiments, a CGH 24 is configured to digitally generate holographic interference patterns. Computer generated holograms have an advantage over optical holograms since there is no need for a real object. The CGH 24 is particularly suited for interference pattern encoding. The CGH 24 includes a plurality of "panes" that provide measurements at different angles. As shown in FIGS. 2A and 2B, the interferometer 22 directs a source of energy (e.g., light) toward the CGH 24, which in turn directs the energy toward the FSM 10, which may be configured as the FSM illustrated in FIGS. 1A and 1B.

Specifically, for the CGH 24 illustrated in FIGS. 2A and 2B, for 1 u rad tilt resolution, sub-apertures of the CGH are at least 31.65 millimeters (mm) in diameter. For a 5×5 array of apertures, the CGH 24 is 6.25 inches×6.25 inches. The CGH 24 has extremely high accuracy. For 1 um grating features, the position accuracy is ~2.2 nanometers (nm). This gives 1.6 u rad error on a two degree diffracted beam. In some embodiments, the CGH 24 comes with pre-written alignment fiducials as part of a "recording/deposition process." During set up, the CGH 24 is aligned to the interferometer 22 using alignment fiducials. Typically, a zeroth-order beam can also be written at the center of the CGH. This configuration enables the FSM 10 to be brought into the interferometric cavity, for alignment at the point of 0 degrees of tip/tilt. Once the system is "nulled" (no discernable fringes at the on axis angle), the angular calibration exercise is executed by moving the FSM 10 until a retro-reflection is achieved at the specific angles while recording the "settings/parameters" of the FSM 10 to achieve the angular position. This method is subsequently repeated until a mapping at each null point of the DOE/CGH is achieved.

During operation, the interferometer 22 generates an input beam that is directed to the CGH. 24. The CGH 24 divides the input beam into a plurality of output beams, which are directed to the FSM 10. The light is reflected by the FSM 10 back through the CGH 24 toward the interferometer 22. The interferometer 22 is configured to detect a tilt angle of the FSM 10, which can be calibrated by manipulating the actuators 18 in the manner described above.

Figure 3A:
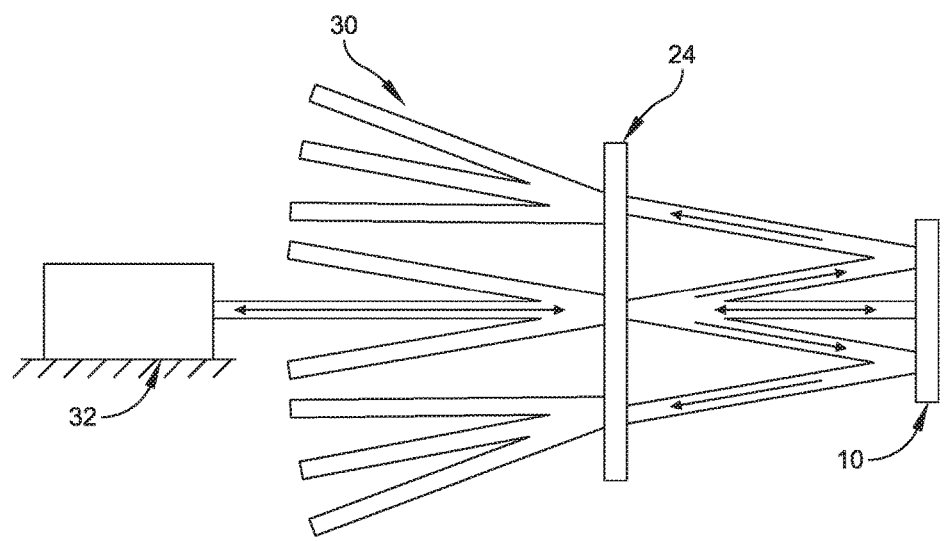
FIGS. 3A and 3B are schematic views of a system to calibrate the fast steering mirror of another embodiment of the present disclosure.
Figure 3B:
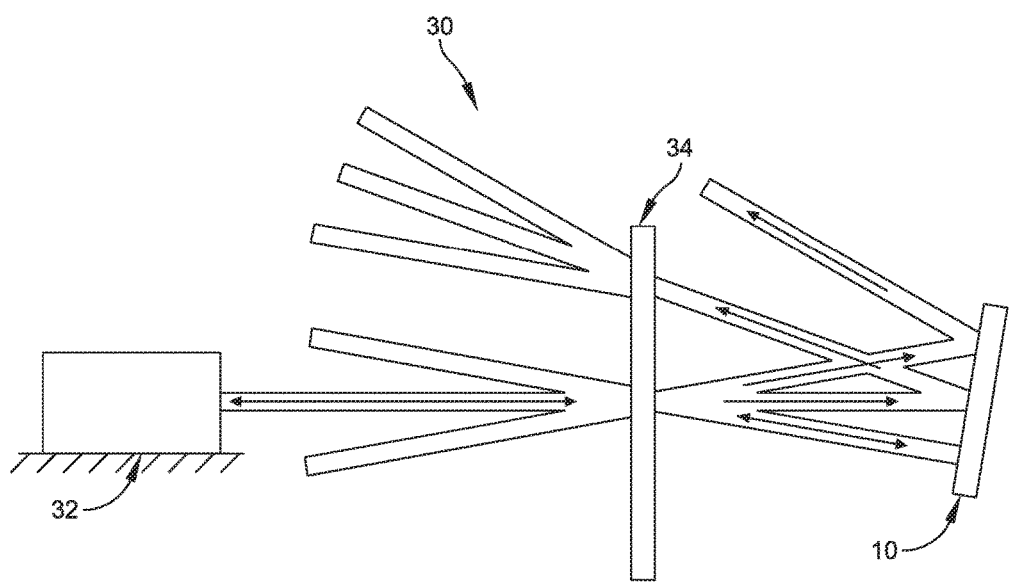

FIGS. 3A and 3B illustrate another embodiment of a calibration system, generally indicated at 30, for calibrating a tilt angle of the FSM 10. The calibration system 30 includes a small aperture interferometer, generally indicated at 32, which may be attached to a fixed surface. The calibration system 30 further includes a small aperture DOE, generally indicated at 34, which is spaced a predetermined distance from the interferometer 32. As described above, the DOE 34 is configured to divide an input beam into a plurality (N) of output beams, with each output beam retaining the same optical characteristics as the input beam. As shown in FIGS. 3A and 3B, the interferometer 32 directs a source of energy (e.g., light) toward the DOE 34, which in turn directs the energy toward the FSM 10, which, as with the embodiment of the system 20 shown in FIGS. 2A and 2B, may be configured as the FSM illustrated in FIGS. 1A and 1B.

Specifically, for the DOE 34 illustrated in FIGS. 3A and 3B, for 1 u rad tilt resolution, beam and diffractive optical element has an aperture of at least 31.65 mm. To measure only the first diffracted orders, the FSM 10 is at least 63.3 mm in diameter. To measure a 5×5 array of angles, the reflective surface 12 of the FSM 10 is 63.29 mm or 2.5 inches diameter. Low diffraction efficiency at higher orders may limit the number of measurable angles.

The operation of the system 30 is similar to the operation of system 20. Specifically, the interferometer 32 generates an input beam that is directed to the DOE 34. The DOE 34 divides the input beam into a plurality of output beams, which are directed to the FSM 10. The light is reflected by the FSM 10 back through the DOE 34 toward the interferometer 32. The interferometer 32 is configured to detect a tilt angle of the FSM 10, which can be calibrated by manipulating the actuators 18.

Embodiments of the system can be used to perform a method to calibrate a tilt angle of the fast steering mirror. In one embodiment, the method includes generating an input beam of electromagnetic radiation from a position sensing device. For example, in one embodiment, the input beam can be generated by interferometer 22. In another embodiment, the input beam can be generated by interferometer 32. Next, the method includes dividing the input beam into a plurality of output beams directed to the FSM 10. For example, in one embodiment, the input beam can be divided by CGH 24. In another embodiment, the input beam can be divided by DOE 34. Next, a tilt angle of the FSM 10 is determined by the resulting electromagnetic radiation being reflected by the FSM back to and detected by the interferometer 22. Once the reflected radiation is detected, the FSM 10 is manipulated to adjust the tilt angle to a desired tilt angle by manipulating the actuators 18 of the FSM 10.

It should be understood that the method of calibrating the FSM 10 can be performed by system 20 or by system 30.

It should be observed that the systems described herein are particularly adapted to perform a method to calibrate fast steering mirrors that includes the use of a DOE, e.g., a CGH, or similar diffractive optical element. The method is particularly suited to determine the angle of returned diffracted beam orders (interferometer or position sensing device). The interferometer provides measurement of mirror tilt relative to the diffracted beam angle. Interferometers can resolve beam tilt to $\frac{1}{20}$th of a wavelength over the beam. An automation sequence is provided for quickly sampling over the FSM range of motion. The CGH can be employed to create multiple plane waves with precise known angles. This method combines the resolution of an interferometer with a large measurement range provided by diffracted orders of a diffractive optical element or CGH.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A calibration system for calibrating a tilt angle of fast steering mirror, the calibration system comprising:
a position sensing device configured to generate a beam of electromagnetic radiation; and
a diffractive optical element, positioned between the position sensing device and the fast steering mirror, the diffractive optical element being configured to divide the input beam into a plurality of output beams directed to the fast steering mirror,
wherein the position sensing device is configured to determine a tilt angle of the fast steering mirror.

2. The calibration system of claim 1, wherein the position sensing device includes an interferometer attached to a fixed surface.

3. The calibration system of claim 2, wherein the interferometer is configured to generate light.

4. The calibration system of claim 1, wherein each output beam retains the same optical characteristics as the input beam, including size, polarization and phase.

5. The calibration system of claim 1, wherein the diffractive optical element is configured to generate one of a 1-dimensional beam array and a 2-dimensional beam matrix.

6. The calibration system of claim 5, wherein the diffractive optical element is configured to be used with monochromatic light generated by the position sensing device, and is designed for a specific wavelength and angle of separation between output beams.

7. The calibration system of claim 1, wherein the diffractive optical element includes a computer generated hologram.

8. The calibration system of claim 1, wherein the fast steering mirror includes a reflective surface, and is configured to manipulate the reflective surface to control a direction of the reflection of electromagnetic radiation off of the reflective surface.

9. The calibration system of claim 8, wherein the fast steering mirror further includes a fixed base, a pivot flexure or bearing, which couples the reflective surface to the base, and several actuators each configured to move the reflective surface relative to the base.

10. A method to calibrate a tilt angle of fast steering mirror, the method comprising:
generating an input beam of electromagnetic radiation from a position sensing device;
dividing the input beam into a plurality of output beams directed to the fast steering mirror; and
determining a tilt angle of the fast steering mirror based on a reflection of the output beams by the fast steering mirror.

11. The method of claim 10, wherein the input beam is generated by a position sensing device, and the plurality of output beams are created by a diffractive optical element between the position sensing device and the fast steering mirror.

12. The method of claim 11, wherein the position sensing device includes an interferometer attached to a fixed surface, the interferometer being configured to generate light.

13. The method of claim 10, wherein each output beam retains the same optical characteristics as the input beam, including size, polarization and phase.

14. The method of claim 10, wherein diffractive optical element is configured to generate one of a 1-dimensional beam array and a 2-dimensional beam matrix.

15. The method of claim 14, wherein the diffractive optical element is configured to be used with monochromatic light generated by the position sensing device, and is designed for a specific wavelength and angle of separation between output beams.

16. The method of claim 10, wherein diffractive optical element includes a computer generated hologram.

17. The method of claim 10, wherein the fast steering mirror includes a reflective surface, and is configured to manipulate the reflective surface to control a direction of the reflection of electromagnetic radiation off of the reflective surface.

18. The method of claim 17, wherein the fast steering mirror further includes a fixed base, a pivot flexure or bearing, which couples the reflective surface to the base, and several actuators each configured to move the reflective surface relative to the base.

* * * * *

UNITED STATES PATENT AND TRADEMARK OFFICE
CERTIFICATE OF CORRECTION

PATENT NO. : 10,330,460 B2
APPLICATION NO. : 15/621230
DATED : June 25, 2019
INVENTOR(S) : Kyle Heideman et al.

It is certified that error appears in the above-identified patent and that said Letters Patent is hereby corrected as shown below:

In the Claims

Column 6, Line 54, delete "angle of fast" and insert -- angle of a fast --

Column 7, Line 27, delete "angle of fast" and insert -- angle of a fast --

Column 8, Line 12, delete "wherein diffractive optical" and insert -- wherein a diffractive optical --

Column 8, Line 20, delete "wherein diffractive optical" and insert -- wherein a diffractive optical --

Signed and Sealed this
Sixth Day of August, 2019

Andrei Iancu
*Director of the United States Patent and Trademark Office*